US009380488B2

United States Patent
Rácz et al.

(10) Patent No.: US 9,380,488 B2
(45) Date of Patent: Jun. 28, 2016

(54) ENHANCED PERFORMANCE SERVICE-BASED PROFILING FOR TRANSPORT NETWORKS

(75) Inventors: Sándor Rácz, Cegléd (HU); Balázs Peter Gerö, Budapest (HU); János Harmatos, Budapest (HU); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 14/350,945

(22) PCT Filed: Oct. 14, 2011

(86) PCT No.: PCT/EP2011/068021
§ 371 (c)(1),
(2), (4) Date: Jul. 23, 2014

(87) PCT Pub. No.: WO2013/053403
PCT Pub. Date: Apr. 18, 2013

(65) Prior Publication Data
US 2014/0328170 A1 Nov. 6, 2014

(51) Int. Cl.
*H04W 28/02* (2009.01)
*H04W 28/10* (2009.01)
(Continued)

(52) U.S. Cl.
CPC ........... *H04W 28/0278* (2013.01); *H04L 47/20* (2013.01); *H04L 47/31* (2013.01); *H04L 47/32* (2013.01); *H04W 28/10* (2013.01); *H04L 47/2416* (2013.01)

(58) Field of Classification Search
CPC ... H04L 12/815; H04L 12/801; H04L 12/911; H04L 12/813; H04L 47/215; H04L 47/31; H04L 47/11; H04L 47/20; H04L 47/10; H04L 47/2441; H04J 1/16; H04J 3/14
See application file for complete search history.

(56) References Cited

U.S. PATENT DOCUMENTS

| 6,970,426 B1 * | 11/2005 | Haddock | H04L 47/10 370/233 |
|---|---|---|---|
| 2002/0107908 A1 * | 8/2002 | Dharanikota | H04L 41/5003 709/203 |

(Continued)

FOREIGN PATENT DOCUMENTS

| EP | 1220493 A1 | 7/2002 |
|---|---|---|
| EP | 2317701 A1 | 5/2011 |

(Continued)

OTHER PUBLICATIONS

IEEE, "Virtual Bridged Local Area Networks—Amendment 4: Provider Bridges", IEEE P802.1ad/D2.4, Draft Standard for Local and Metropolitan Area Networks, Sep. 27, 2004, pp. 1-129.

(Continued)

*Primary Examiner* — Jung-Jen Liu
(74) *Attorney, Agent, or Firm* — Murphy, Bilak & Homiller, PLLC

(57) ABSTRACT

A method is presented of transporting data packets over a telecommunications transport network. The data packets are carried by a plurality of bearers. For each of the bearers, independently of the other bearers, bandwidth profiling is applied to the data packets of the bearer to designate as 'green' data packets that are conformant with a predetermined maximum Information Rate for the bearer. One or more data packets is buffered for up to a predetermined maximum 'green' buffer time, during which if transporting the data packet would not cause the maximum information rate of the bearer to be exceeded, the data packet is designated as a 'green' data packet. The data packets are forwarded for transporting over the transport network. If there is insufficient bandwidth available in the transport network to transport all data packets, data packets that are not designated as 'green' data packets are discarded, so as not to be transported through the transport network.

13 Claims, 6 Drawing Sheets

(51) Int. Cl.
*H04L 12/813* (2013.01)
*H04L 12/833* (2013.01)
*H04L 12/823* (2013.01)
*H04L 12/853* (2013.01)

(56) References Cited

U.S. PATENT DOCUMENTS

| | | | |
|---|---|---|---|
| 2004/0052212 A1* | 3/2004 | Baillargeon | H04L 1/0002 370/235 |
| 2005/0135378 A1 | 6/2005 | Rabie et al. | |
| 2005/0232150 A1* | 10/2005 | Nishimura | H04L 47/215 370/230 |
| 2006/0176818 A1 | 8/2006 | Olsen et al. | |
| 2006/0187827 A1 | 8/2006 | Smith et al. | |
| 2006/0187839 A1* | 8/2006 | Smith | H04L 47/10 370/235 |
| 2006/0215558 A1 | 9/2006 | Chow et al. | |
| 2008/0095049 A1* | 4/2008 | Bugenhagen | H04L 67/141 370/229 |
| 2008/0155087 A1* | 6/2008 | Blouin | H04L 43/0817 709/223 |
| 2009/0245104 A1* | 10/2009 | Nishimura | H04L 47/10 370/230 |
| 2010/0061260 A1* | 3/2010 | Bugenhagen | H04L 12/2602 370/252 |
| 2010/0135229 A1 | 6/2010 | Lohr et al. | |
| 2010/0322072 A1* | 12/2010 | Fujihira | H04L 45/50 370/230 |
| 2011/0158101 A1 | 6/2011 | Figueira | |
| 2012/0195326 A1* | 8/2012 | Krzanowski | H04L 47/762 370/468 |
| 2014/0286169 A1* | 9/2014 | Gunduzhan | H04L 47/10 370/235 |
| 2014/0293793 A1 | 10/2014 | Rácz et al. | |
| 2014/0301195 A1 | 10/2014 | Briscoe et al. | |

FOREIGN PATENT DOCUMENTS

| | | |
|---|---|---|
| WO | 2007078404 A1 | 7/2007 |
| WO | 2008049425 A1 | 5/2008 |
| WO | 2008055936 A1 | 5/2008 |
| WO | 2013053404 A1 | 4/2013 |
| WO | 2013053405 A1 | 4/2013 |

OTHER PUBLICATIONS

Unknown, Author, "Carrier Ethernet Class of Service—Phase 1", The Metro Ethernet Forum, MEF 23, Implementation Agreement, 2009, pp. 1-41.

Third Generation Partnership Project, "3GPP TS 29.303 V9.2.0 (Sep. 2010)", 3rd Generation Partnership Project; Technical Specification Group Core Network and Terminals; Domain Name System Procedures; Stage 3 (Release 9). Sep. 2010. pp. 1-51.

Third Generation Partnership Project, "3GPP TS 23.003 V9.4.0 (Sep. 2010)", 3rd Generation Partnership Project; Technical Specification Group Core Network and Terminals; Numbering, addressing and identification (Release 9). Sep. 2010. pp. 1-76.

Santitoro, R., "Bandwidth Profiles for Ethernet Services," Annual Review of Communications. National Engineering Consortium; XP-001520497; Jan. 1, 2005. pp. 349-355. vol. 58. Chicago, Illinois, US.

Third Generation Partnership Project, "3GPP TS 23.401 V10.5.0 (Sep. 2011)," 3rd Generation Partnership Project; Technical Specification Group Services and System Aspects; General Packet Radio Service (GPRS) enhancements for Evolved Universal Terrestrial Radio Access Network (E-UTRAN) access (Release 10). Sep. 2011. pp. 1-282.

Heinanen, J., et al., "A Two Rate Three Color Marker," Network Working Group; Request for Comments: 2698; Sep. 1999. pp. 1-6.

Author Unknown, "G.8011 Version 3 Draft," Editor G.8011. Draft ITU-T Recommendation G.8011/Y.1307 version 3. Ethernet Service Characteristics. Sep. 2011. pp. 1-40. Chengdu, China.

Sanitoro, Ralph, "Metro Ethernet Services—A Technical Overview", Metro Ethernet Forum, 2003, http://www.mef.net/Assets/White_Papers/Metro-Ethernet-Services.pdf, 2003, 1-12.

Santitoro, Ralph, "Bandwidth Profiles for Ethernet Services", Metro Ethernet Forum, 2004-2009, https://www.mef.net/Assets/White_Papers/Bandwith-Profiles-for-Ethernet-Services.pdf, 2004, 1-8.

* cited by examiner

ENHANCED PERFORMANCE SERVICE-BASED PROFILING FOR TRANSPORT NETWORKS

TECHNICAL FIELD

The present invention relates to improvements in the handling of data communications transmitted across a transport network.

BACKGROUND

A transport network (TN) is used to carry data signals between a Radio Base Station (RBS), such as a NodeB or an eNodeB in 3G Long-Term Evolution (LTE) networks, and a Serving gateway (S-GVV) or Packet Data Network gateway (PDN-GW). With the rapid growth of digital data telecommunications following the introduction of 3G and 4G technology, TNs may frequently act as bottlenecks in the overall data transport process. Thus, various systems and methods have been proposed for improving or prioritising the way that data packets are transported by the bearers.

Service differentiation in the Radio Access Network (RAN) is one supplementary means for more efficiently handling high volumes of traffic. As a simple example, using service differentiation a higher bandwidth share can be provided for a premium service, and in this way the overall system performance can be improved. As another example, a heavy service such as p2p traffic, can be down-prioritized. Implementing such service differentiation methods requires integration into the Quality of Service (QoS) concept of LTE and Universal Mobile Telecommunications System (UMTS) technology. Details of the QoS concept for LTE can be found in the $3^{rd}$ Generation Project Partnership (3GPP) Technical Specification TS 23.410. The main idea of this concept is that services with different requirements use different bearers.

Service differentiation can be applied for both guaranteed bit-rate (GBR) and non-GBR traffic. The present disclosure is concerned only with non-GBR traffic.

FIG. 1 illustrates schematically a TN between an eNodeB 104 and a S-GW 106 for the LTE example. This shows non-GBR data packets 120, that include packets 120a of a first bearer that relate to a first service provided by a first server 110, and packets 120b of a second bearer that relate to a second service provided by a second server 112. These data packets 120 are destined for user equipment such as UE 102 at the other side of the TN, where the arriving data packets are handled by a scheduler 114 and eNodeB 104. In addition to the non-GBR data packets, the TN also handles synchronization data and voice or other GBR traffic, as shown, and which has a strict priority above non-GBR traffic but which is not a concern of the present disclosure. The bandwidth available for sending the non-GBR traffic is shared between the bearers, but when there is congestion so that there is insufficient bandwidth for the TN to handle all the non-GBR traffic, then some data packets have to be dropped (shown as RED dropped packets in the Figure). The problem that is addressed below concerns a mechanism for deciding which non-GBR data packets should be dropped.

The bandwidth share of a Bearer cannot be controlled by the RAN, and so instead the sharing of bandwidth between the Bearers is currently mainly determined by the application level protocols, the service used and the user behaviour. In the current LTE solution for non-GBR traffic, as shown in FIG. 1, the traffic flow through the TN bottleneck is handled by the application level Transmission Control Protocol (TCP). For the High-Speed Downlink Packet Access (HSDPA) protocol there are two approaches to handling TN congestion. One is a rate-based solution where service differentiation can be applied. The problem with this solution is that it is not compatible with TCP congestion control. Therefore separate queues need to be implemented in the TN for HSDPA and LTE traffic. The other approach is an Active Queue Management (AQM) based congestion control (ABCC) for HSDPA as described in which the application level TCP is notified about TN congestion and can then be used to resolve the TN congestion. This solution has the advantage in that it is essentially compatible with LTE. However, there are architectural limitations, particularly as it requires communication between the nodes that are sharing the same TN bottleneck.

Currently there is no common solution that provides efficient Bearer level service differentiation. The existing approaches all suffer from limitations as described above. Even if equal sharing between bearers, rather than service differentiation, was desired some mechanism would be needed to avoid very unfair situations arising. This unfairness is illustrated below. Currently, in a RAN TN-limited case, where resource sharing between users (bearers) is based on a per-TCP flow (as currently applied in LTE) very unfair bandwidth sharing between users can result. This unfairness can be demonstrated with reference to the illustration of FIG. 2.

The left-hand part of FIG. 2 illustrates how bandwidth is shared between two bearers in a RAN TN. One bearer is handling the traffic of a single aggressive user with several (in this example 4) parallel TCP flows, while another bearer is handling the traffic of a normal user with a single TCP flow. In this case, the aggressive user effectively throttles the TN by taking up the majority of the available bandwidth. In this Radio limited case a Uu scheduler guarantees the required fairness among bearers as each user is essentially assigned the proper bandwidth, meaning that the aggressive user's access rate is effectively limited. Just for comparison, the right-hand part of FIG. 2, illustrates what occurs in an Asymmetric Digital Subscriber Line (ADSL).

Note that for the case of internet access, with a large user aggregation the capacity of the aggregation is much greater than the peak rate of a user, and so this does not present a serious problem because many aggressive users would be needed. However, this situation may change with increasing access rates, giving rise to similar unfairness problems.

As FIG. 2 shows, without a service differentiation method the bandwidth share depends on the nature of the services being used (e.g. typically a p2p service uses many parallel TCP flows), which is in direct contrast to what the operator wants (i.e. to provide premium services with a higher bandwidth share than low priority services).

The present invention has been conceived with the foregoing in mind.

SUMMARY

According to a first aspect, there is provided a method of transporting data packets over a telecommunications transport network. The data packets are carried by a plurality of bearers. For each of the bearers, independently of the other bearers, bandwidth profiling is applied to the data packets of the bearer to designate as 'green' data packets that are conformant with a predetermined maximum Information Rate for the bearer. One or more data packets is buffered for up to a predetermined maximum 'green' buffer time, during which if transporting the data packet would not cause the maximum information rate of the bearer to be exceeded, the data packet is designated as a 'green' data packet. The data packets are forwarded for transporting over the transport network. If there is insufficient bandwidth available in the transport network to transport all data packets, data packets that are not designated as 'green' data packets are discarded, so as not to be transported through the transport network.

According to a second aspect there is provided a telecommunications network entity configured to receive data packets of a plurality of bearers prior to forwarding the data packets for transport over a transport network, TN. The network entity comprises a bandwidth profiler configured to apply bandwidth profiling to the data packets of a bearer independently of the other bearers, and to designate as 'green' data packets that are conformant with a predetermined maximum Information Rate of the bearer. The bandwidth profiler further comprises a buffer for buffering one or more data packets for up to a predetermined maximum 'green' buffer time. The profiler is configured to designate a data packet in the buffer as a 'green' data packet if transporting the data packet would not cause the maximum information rate of the bearer to be exceeded.

It is an advantage that, by employing 'color' profiling to teach bearer and including per-bearer buffering to the profiling, a more deterministic and accurate sharing of resources is achieved. Also, shorter TN buffering is needed.

DETAILED DESCRIPTION OF PREFERRED EMBODIMENTS

Figure 1:
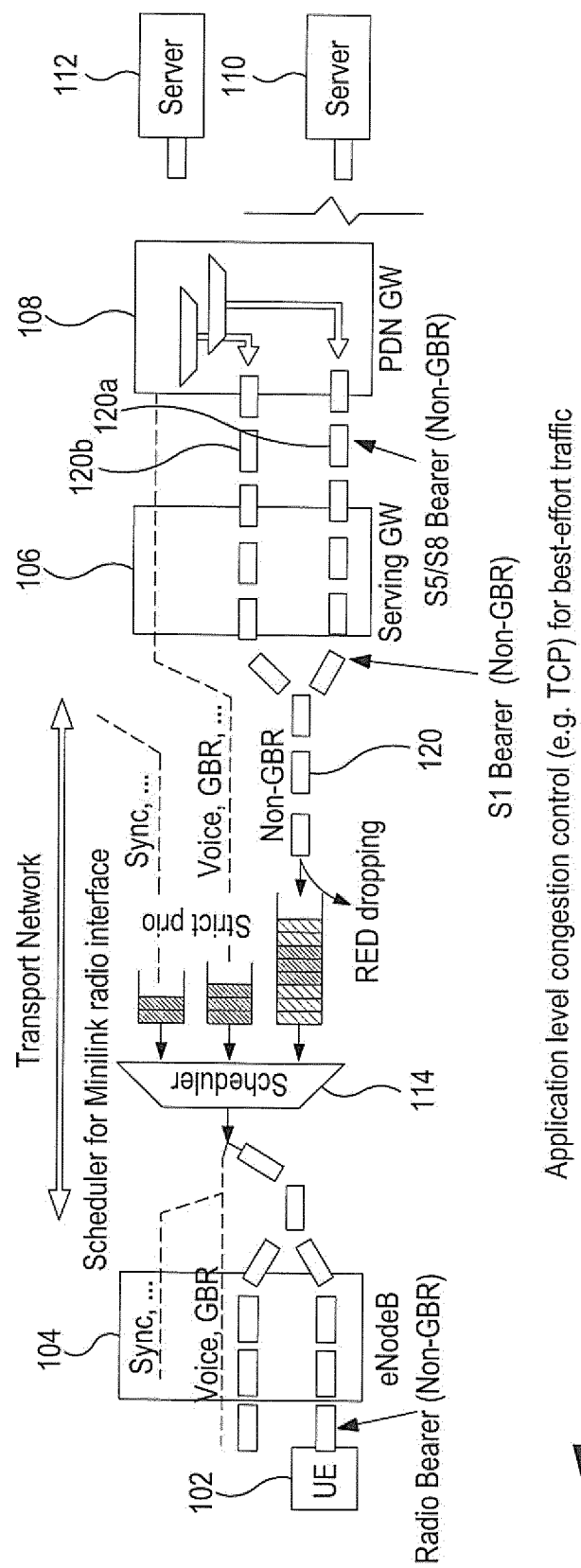
FIG. 1 is a schematic illustration showing how service differentiation is applied in existing TNs involving an LTE architecture.
Figure 2:
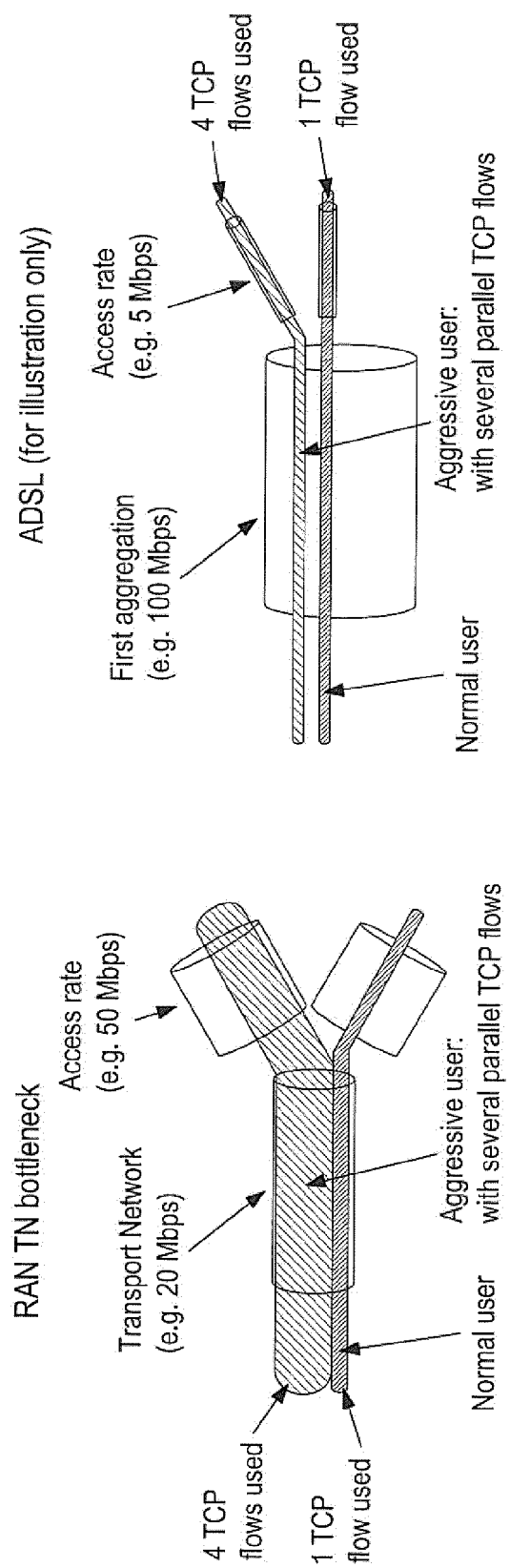
FIG. 2 is a schematic illustration comparing bandwidth sharing between bearers in a TN and in an ADSL.
Figure 3:
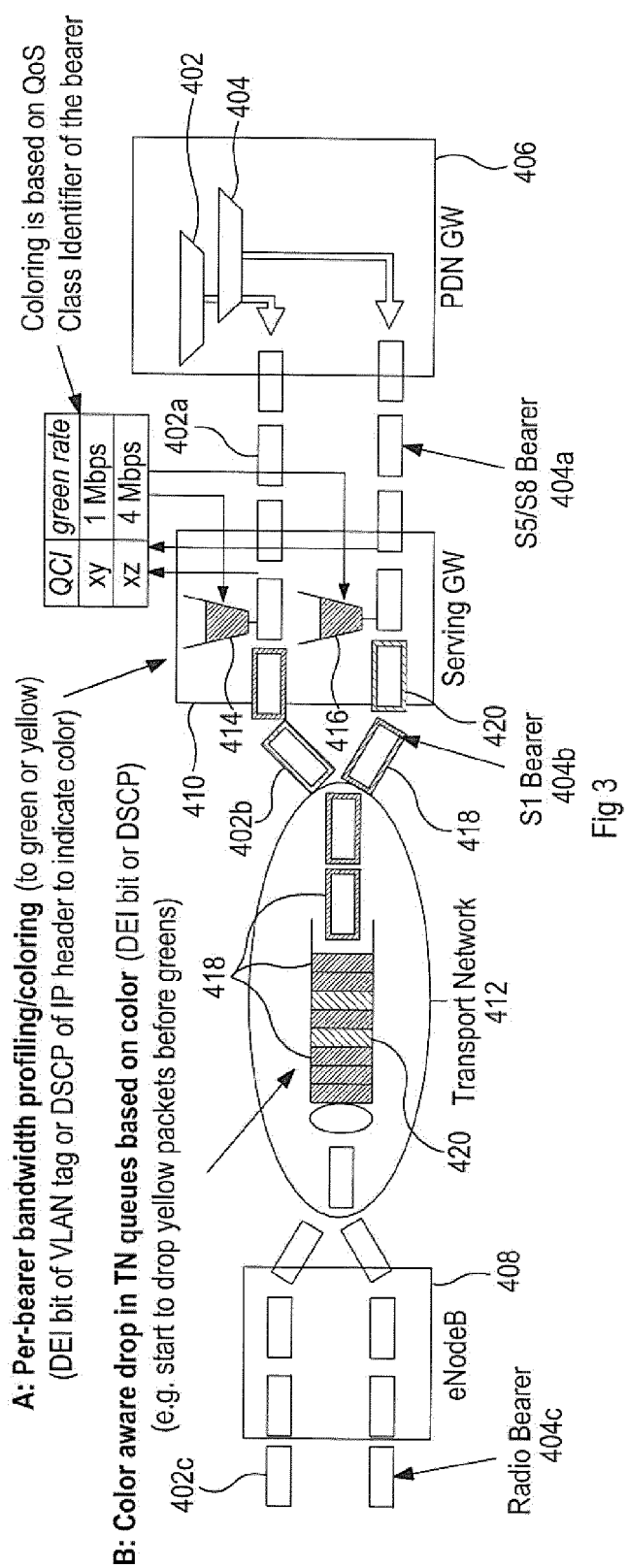
FIG. 3 is a schematic illustration of a TN employing bandwidth profiling for each bearer.

The embodiments described herein apply per-Bearer bandwidth profiling to control resource sharing among Bearers carrying different services. The embodiments employ a 'color' profiling scheme of the type described by The Metro Ethernet Forum in http://metroethernetforum.org/PDF_Documents/Bandwidth-Profiles-for-Ethernet-Services.pdf. In this scheme, packets, or frames, are assigned a color (green, yellow, or red) according to whether they are conformant with the bandwidths as specified in a Service Level Agreement (SLA). Essentially: packets assigned 'green' are conformant and are delivered in accordance with the SLA specification; packets assigned 'yellow' are out-of profile, but may be delivered if there is bandwidth available, for example because they are conformant with some specified excess bandwidth requirements; and packets assigned red are out-of profile and immediately discarded. Thus, for the present purposes, as shown in FIG. 3, the color assigned by the profiler is propagated to the TN bottleneck and it is used to determine which packets (i.e. 'yellow' packets) may be dropped at the TN bottleneck if there is insufficient bandwidth. It will be appreciated that the 'colors' are simply a convenient label that is applied to differentiate the packets in the profiler.

To implement the color profiling scheme described by the Metro Ethernet Forum a Committed Information Rate (CIR) is specified, and additionally an Excess Information Rate (EIR) may be specified. These profile rates are enforced through an algorithm referred to as a 'token bucket', which reservoir referred to as a 'bucket' of bytes referred to as 'tokens'. As data packets arrive, provided the number of tokens (bytes) in the 'green' bucket exceeds the byte size of the packet, it is colored 'green'. The number of 'green' tokens in the bucket is decremented by an amount that corresponds to the 'green' packet size. 'Green' tokens are replenished in the 'green' bucket at a rate determined by the specified CIR, and hereafter referred to as the 'green' rate. If there are insufficient tokens in the 'green' bucket, the packet is either colored 'yellow', or if an EIR has been specified, it is passed to a 'yellow' bucket where in the same way the packet is either colored 'yellow' if there are sufficient 'yellow' tokens in the bucket, or is otherwise colored red and discarded. The number of 'yellow' tokens is decremented in the same way, and the 'yellow' tokens in the 'yellow' bucket are replenished at a rate determined by the specified EIR.

Referring to FIG. 3, where the example is shown of an LTE system with two bearers 402, 404 each carrying data packets between a PDN-GW 406 and an eNodeB 408 via a S-GW 410 and through a TN 412. The Bearers 402, 404 are designated S5/S8 bearers 402a, 404a between the PDN-GW 406 and the S-GW 410, S1 bearers 402b, 404b from the S-GW 410 over the TN 412, and radio bearers 402c, 404c beyond the eNodeB 408. Each Bearer is assigned a bandwidth profiler—profiler 414 for bearer 402 and profiler 416 for bearer 404. In this example, the profilers 414, 416 are located in the S-GW 410, but this is not a requirement. The profiling can be implemented in any node where per-Bearer handling and coloring is possible.

Each of the bearers has an assigned QoS Class Identifier (QCI) and an associated predefined 'green' rate (CIR) and bucket size. In this example there is no EIR specified, and so there is no 'yellow' rate or 'yellow' bucket—i.e. a two-color (green-yellow) profiler is used for each Bearer. However, it would be perfectly possible for the profilers 414, 416 to be 3-colour profiler, in which case each profiler would include an additional 'yellow' bucket, and a 'yellow' rate (EIR) at which 'yellow' tokens arrive would be specified. Packets that were not colored 'green' would be passed to the 'yellow' bucket, and then any packets that did not conform with the specified EIR would be colored 'red' and discarded.

The bucket size and 'green' rate at which rate the green tokens arrive into the buckets for each of the Bearers (and, if used the 'yellow' rates) are set by the operator. Operators may take account of a variety of available information in order to set the 'green' rate for a particular bearer. This may be based, at least in part, on the available service information of the Bearer (roughly speaking the QoS requirement of the Bearer, which in the case of LTE is coded in the QCI value). Thus, a predefined green rate may be assigned for a given QCI value. When setting the 'green' rates, the operator may also take into account of various information, for example: (i) information about the service(s) and subscriptions; (ii) information about the TN; and (iii) information about traffic.

Packets of each Bearer 402, 404 that conform with the bearer's profiler 414, 416 are marked as conformant packets 418 (i.e. designated 'green') and packets that do not conform are marked as non-conformant packets 420 (i.e. designated 'yellow'). Because, in this example, there are no 'yellow' buckets all data packets that are not colored 'green' by the profilers 414, 416 are designated 'yellow' (and thus there are no 'red' packets). For example, assume that the 'green rate' is 5 Mbps for a Bearer and the bitrate of this Bearer is about 7.5 Mbps. In this case, approximately ⅓ of the packets of the Bearer will be assigned to 'yellow'.

The TN 412 bottleneck active queue management can then use the color information marked in the data packets when choosing which packets to drop when there is insufficient bandwidth (congestion). The first packets to be dropped will be the 'yellow' packets 420. In other words a 'color aware' dropping of data packets is used in TN bottleneck queue.

When the profiler 414, 416 designates a Packet as either 'green' or 'yellow', this means that the packet is marked with the conformance information in such a way it can be used at the TN bottleneck buffer(s). For example the Drop Eligibility (DEI) bit of the packet's Ethernet frame, or the Differentiated Services Control Point (DSCP) field in the IP header could be used to indicate if a packet has been designated as 'green' or 'yellow'. Other mechanisms might also be used. In some cases additional mapping might be needed, for example to fill in the DEI bit based on the DSCP value. The only requirement is that the color information that is assigned to the packets of a Bearer by the profiler must be kept by the packets up until the TN bottleneck so as to be available for the color aware dropping of packets.

The color profiling based Traffic Management (TM) described above serves to improve the sharing of resources in the TN. Profiling is used to improve the fairness of resource sharing between services, by controlling which packets are dropped before the TN. Thus the bitrate of each radio bearer (RB) is controlled by the dropping of 'yellow' packets. However, this approach is only effective, in terms of the fairness of the resource sharing, if the TN bottleneck is large enough. Therefore, to enhance the effectiveness of the profiling, when there are insufficient 'green' tokens for an incoming packet the packet is held in a buffer until sufficient additional 'green' tokens arrive. To control the buffering delay a limit (maximum waiting time) is placed on how long the packet is allowed to be held in the buffer, and also a limit (maximum queue length) is placed on the total size, or number of packets in the buffer.

In the simplest embodiment, the EIR is infinity, i.e. there is no 'yellow' bucket and so all packets are either coloured 'green' or 'yellow'. If the maximum waiting time of the first packet placed in the buffer has elapsed before sufficient 'green' tokens arrive in the bucket, then the first packet is colored 'yellow' and passed to the TN entry point, where it will either be allowed over the TN or dropped (depending on the bandwidth available in the TN). Similarly, when an incoming packet arrives, if the maximum queue length is exceeded then the first (i.e. oldest) packet is designated as a 'yellow' packet and passed to the TN entry point, where it will either be allowed over the TN or dropped. If the maximum queue length is specified in terms of a number of packets, then the incoming packet is simply placed in the buffer queue. If the maximum queue length is specified as a maximum total size of packets (in bytes), then, provided the departure of the oldest packet from the buffer queue has released enough space for it, the incoming packet is stored in the queue; otherwise the next oldest packet in the queue is designated as 'yellow' and passed to the TN entry point.

Figure 4:
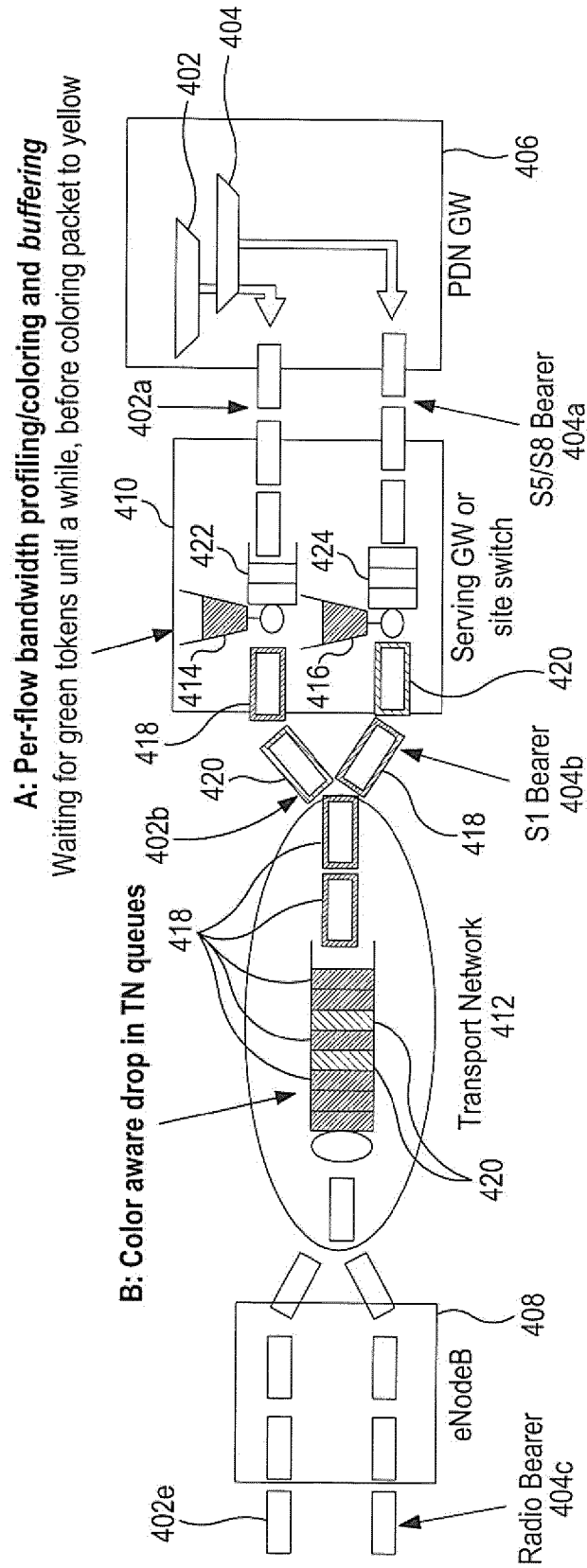
FIG. 4 is a schematic illustration of a TN employing bandwidth profiling and buffering for each bearer.

An example of the above method is shown and described here with reference to FIG. 4. This depicts the same color profiling arrangement for a TN 412 as shown in FIG. 3, and equivalent features have the same reference numerals. However, in this instance, for each of the profilers 414, 416 of the respective bearers 402, 404 there is a buffer 422, 444 through which the incoming data packets pass. For each bearer buffering is used, as described above, to wait for green tokens to arrive before colouring to yellow for up to a maximum waiting time (e.g. 200 ms) and for up to a maximum number of packets (e.g. 20) or a maximum size of the packets in the buffer queue (e.g. data packets that can be carried by an Ethernet frame are typically between 570 and 1500 bytes, which could be used to set a maximum total size based on a projected average number of packets in the queue). The buffers 422, 424 need to be implemented wherever (i.e. in whichever node) that the profilers 414, 416 are implemented. As shown in FIG. 4 the buffers 422, 424 are implemented in the S-GW, or site switch 410. However, this could also be done in the PDN-GW in the case of an LTE architecture, or, in the case of HSDPA, in the RNC or GGSN.

Note that the additional per-Bearer buffering is used in addition to the TN buffering (where a common buffer is used for buffering all the data packets of all of the Bearers prior to sending them across the TN). A number of factors may be considered when setting the per-Bearer buffer size, for example: the TN buffer length, RTT, delay requirement of the Bearer, and bucket size for coloring. For example, a larger buffer might be used for a download-oriented bearer and a very short buffer (or no buffering at all) for delay-sensitive bearers.

Figure 5:
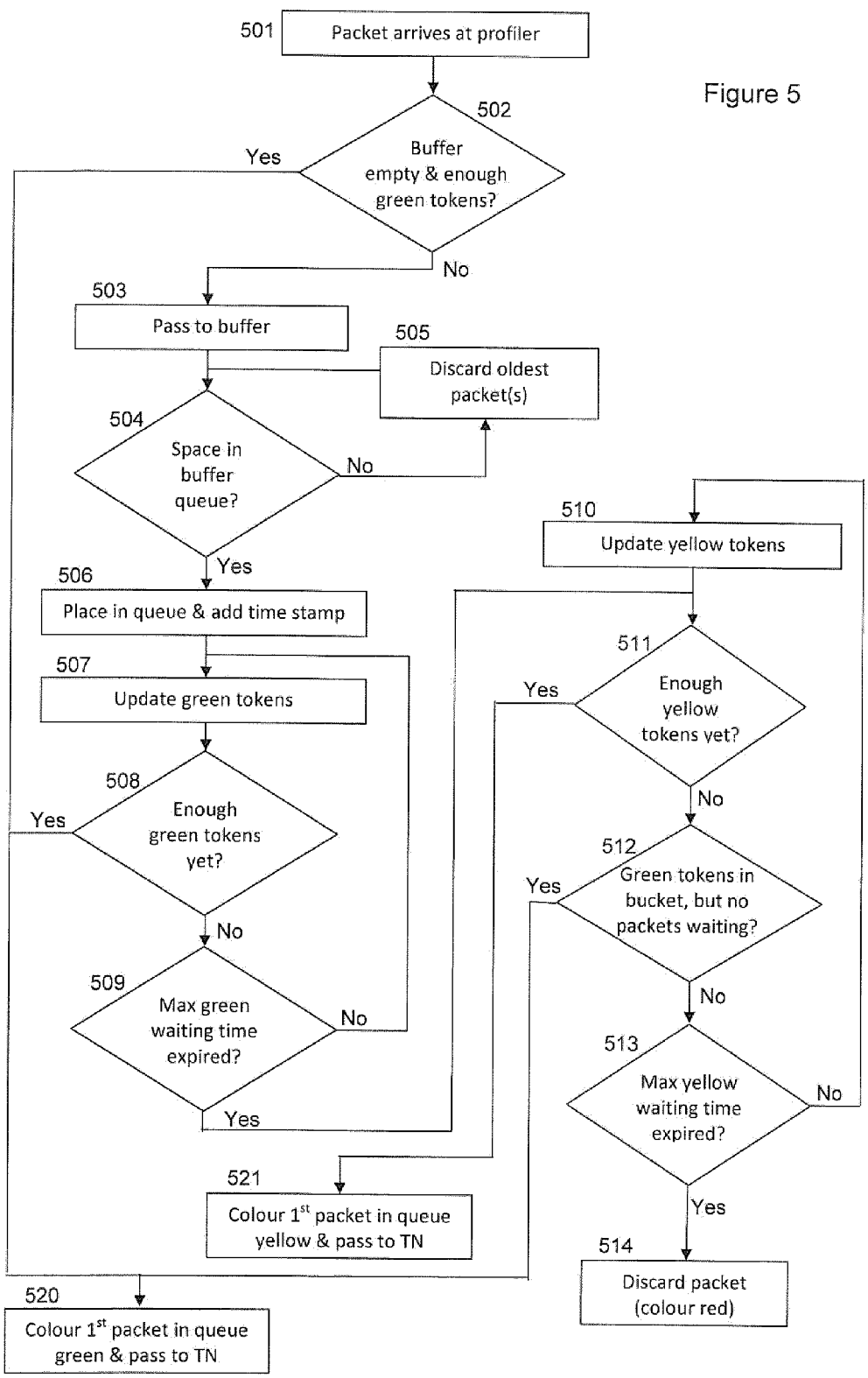
FIG. 5 is a flow diagram illustrating the process steps according to one embodiment.

FIG. 5 is a flow diagram illustrating the procedure that is followed in a profiler of a bearer, in an embodiment that has both 'green' and 'yellow' buckets. Three parameters are specified, namely:

Queue size, specified either in bytes, or as a maximum number of packets—this sets a maximum limit for the queue of packets that are buffered waiting for green or yellow tokens;

max_waiting_time_for_green_token—this is the maximum waiting time for 'green' tokens in the 'green' buffer;

max_waiting_time_for_yellow_token—this is the maximum waiting time for yellow tokens, and in this example it includes the waiting time for green tokens as well (i.e. it is the aggregated waiting time). For example assume that the maximum waiting time for green tokens is 50 ms and for yellow tokens is 100 ms, then when a packet arrives it waits maximum 50 ms for green tokens but if during the 50 ms not enough green tokens arrive then it can wait a further 50 ms in the 'yellow' buffer for 'yellow' tokens.

In the method there are three events where an action is taken:

at packet arrivals;

at arrival of new tokens in the bucket—the number of available tokens can be updated periodically, e.g. every 10 ms, or can be updated when a certain size of the tokens is reached e.g. 1.5 Kbyte (equivalent to 10 ms for a CIR of 1.2 Mbps); and at buffer queue update (dropping of old packets).

Referring to FIG. 5, at step 501 a new packet arrives at the bearer profiler. At step 502 a determination is made as to whether there are enough 'green' tokens in the bucket for the incoming packet, and whether the 'green' buffer queue is empty. If the answer is yes, then the procedure continues directly to step 520, where the packet is designated as 'green' and passed immediately to the TN. If not, then at step 503 the packet is passed to the buffer queue.

At step 504 a determination is made as to whether there is enough space in the buffer queue for the incoming packet (i.e. would adding the packet to the queue exceed the maximum queue size?). If the answer is 'yes' then the oldest packet (or if necessary the oldest two or more packets) are discarded (dropped from the buffer queue) at step 505, so that the incoming packet can be fitted into the queue without exceeding the predefined maximum queue size. For example if the maximum queue size is 100 Kbytes and there are already 99 Kbytes of packets in the queue when a new 1.5 Kbyte packet arrives, then one or more packets must be dropped (from the front of the queue, i.e. oldest packets) until there is space for this 1.5 Kbyte packet. Note that this is a 'first-in-first-out' (FIFO) scheme, but other queuing schemes are also possible as an option, e.g. Random Early Discard or Tail Dropping). Once there is space for the incoming packet then the packet is put into the buffer queue and a time stamp is added for the packet (step 506).

At step 507 the number of 'green' tokens in the 'green' bucket is updated. This may be triggered by the arrival of a new 'green' token, or may be a periodic update of the tokens in the bucket. If at this stage the buffer queue had been empty, then the newly arrived tokens would simply be placed into the bucket. However, in the procedure illustrated in FIG. 5 the queue is not empty and so, at step 508 a check is made as to whether there are enough 'green' tokens in the bucket to enable delivery of one or more packets from the queue. In that case, starting with the oldest packets, as many packets as possible are colored 'green' and delivered from the queue by proceeding to step 520. At the same time the number of 'green' tokens in the bucket is decremented by the amount corresponding to the size of the delivered packets.

If, at step 508, there are not enough 'green' tokens to deliver any packets from the buffer queue, then at step 509 a check is made of the time stamps of packets in the 'buffer queue, and when a packet is not older than the "max_waiting_time_for_green_token" the procedure loops back to step 507. As shown in FIG. 5, this is a 'running' check performed every time the process reaches this point. However, this could alternatively be implemented as a periodical check, in which case step 509 would only be implemented periodically, and would otherwise be skipped with the procedure looping back to step 507.

At step 509, if a packet in the queue is older than the "max_waiting_time_for_green_token" then the procedure continues to step 511, to determine if the packet might be colored 'yellow'.

At step 510 the number of 'yellow' tokens in the 'yellow' bucket is updated. This may be triggered by the arrival of a new 'yellow' token, or may be a periodic update of the tokens in the bucket. Then, at step 511 a check is made as to whether there are enough 'yellow' tokens in the bucket to enable delivery of one or more packets from the queue. In that case, starting with the oldest packets in the queue, as many packets as possible are colored 'yellow' and delivered from the queue by proceeding to step 521. At the same time the number of 'yellow' tokens in the bucket is decremented by the amount corresponding to the size of the delivered packets.

If, at step 511, there are not enough yellow tokens, then at step 512 the question is asked as to whether there are now green tokens in the bucket, but no packets waiting in the buffer that are younger than the "max_waiting_time_for_green_token". If there are, then the first packet in the queue can be re-colored to 'green' by passing to step 520, even though the packet has been waiting in the buffer queue for longer than would normally be permitted for a 'green' packet.

If, at step 511, there are not enough 'yellow' tokens to deliver any packets from the buffer queue, and at step 512 no packets were re-colored to 'green', then at step 513 a check is made of the time stamps of packets in the buffer queue, and when a packet is not older than the "max_waiting_time_for_yellow_token" the procedure loops back to step 510.

If at step 513 a packet is found to be older than the "max_waiting_time_for_yellow_token" then at step 514 the packet is dropped, which in this case means it is discarded (colored red). Note that the discarding of the packet occurs because during the maximum waiting time for 'yellow' tokens (which includes the maximum waiting time for 'green tokens') neither enough green nor enough yellow tokens arrived for the packet to be delivered to the TN.

Figure 6:
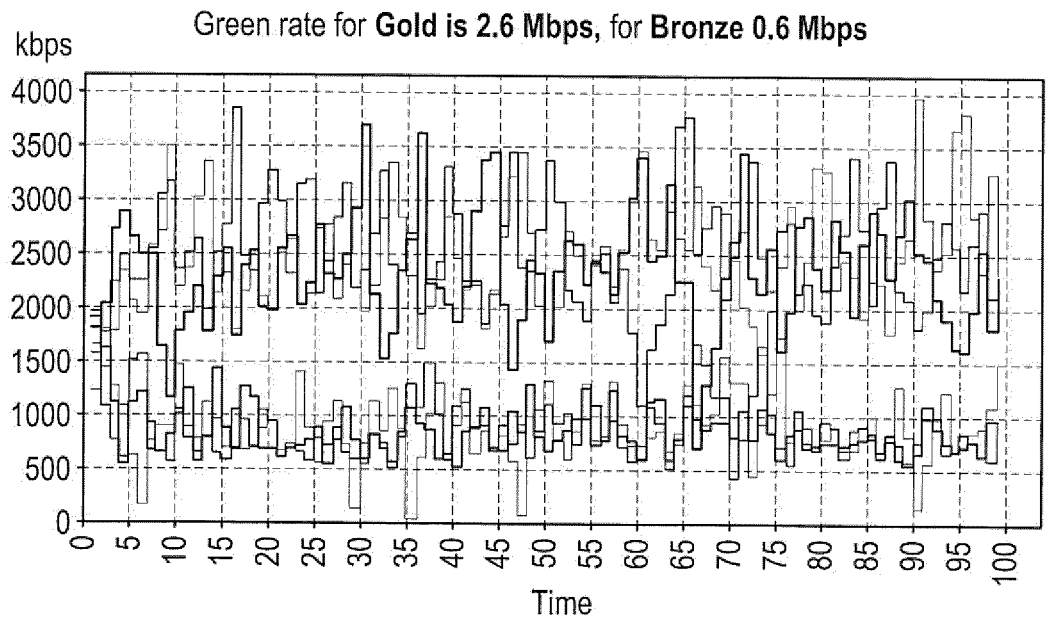
FIG. 6 shows two graphs comparing bandwidth resource sharing over time for six bearers in a TN, both with and without bandwidth profiling of each bearer.
Figure 6:
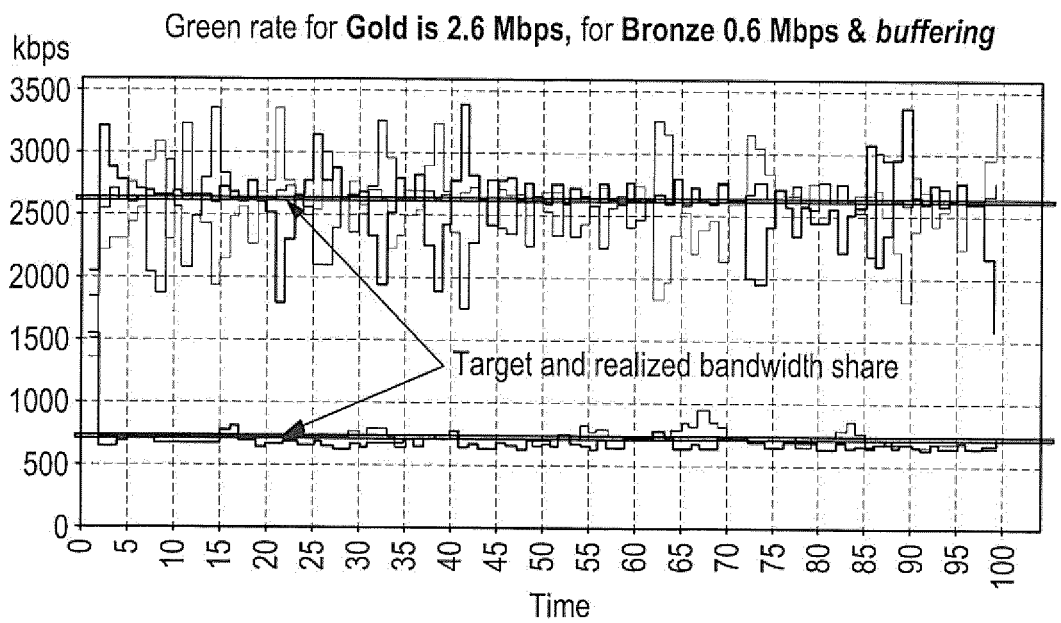

FIG. 6 shows two graphs from simulations that illustrate the potential gain that can be realized with the per-bearer buffering as described above. In the upper graph profiling is used without buffering (as shown and described above in FIG. 3), whereas in the lower graph profiling is used with per-bearer buffering method (maximum waiting time 200 ms, maximum queue size 20 IP packets). The results relate to a 10 Mbps TN bottleneck and 3 bearers with 2.6 Mbps green rate (Gold users) and 3 bearers with 0.6 Mbps green rate (Bronze users). A very large yellow rate is applied for all bearers. The TN bottleneck uses color aware dropping of packets as described. The graphs show that including per-bearer buffering to the profiling results in more deterministic and accurate resource sharing.

Further advantages of the method described above are that shorter TN buffering is needed. Also, the advanced profiling and buffering result in higher TN utilization. As FIG. 6 shows, with buffering there is more stable resource sharing. Also, buffering can result in a better balance between TN utilization and queuing delay.

The invention claimed is:

1. A method of transporting data packets over a telecommunications transport network between a Serving gateway, S-GW, or Packet Data Network gateway, PDN-GW, and a radio base station, wherein the data packets are carried by a plurality of non-Guaranteed Bitrate, non-GBR, bearers, the method comprising:

at a network node configured to handle the data packets on a per-bearer basis, for each of the bearers, independently of the other bearers, applying bandwidth profiling to the data packets of the bearer, wherein data packets are designated as 'green' data packets or as 'yellow' data packets, 'green' data packets being conformant with a predetermined committed Information Rate for the bearer and 'yellow' data packets not being conformant with the committed Information Rate, and wherein the bandwidth profiling comprises:

buffering one or more data packets for up to a predetermined maximum 'green' buffer time, during which if transporting the data packet would not cause the committed Information Rate of the bearer to be exceeded, the data packet is designated as a 'green' data packet; and forwarding the data packets designated as 'green' data packets and the data packets designated as 'yellow' data packets to an entry point of the transport network, where if there is insufficient bandwidth available in the transport network to transport all data packets, 'yellow' data packets are first to be discarded, so as not to be transported through the transport network.

2. The method of claim 1, wherein if a data packet has been buffered for the maximum 'green' buffer time, the data packet is designated as a 'yellow' data packet.

3. The method of claim 1, wherein a data packet is only designated as 'yellow' if it is also conformant with a predetermined Excess Information Rate (EIR) of the bearer.

4. The method of claim 3, wherein if a data packet has been buffered for the maximum 'green' buffer time, and the data packet is non-conformant with the predetermined EIR, the data packet is buffered for up to a predetermined maximum 'yellow' buffer time, during which if transporting the data packet over the transport network would not cause the excess Information Rate of the bearer to be exceeded, the data packet is designated as a 'yellow' data packet.

5. The method of claim 1, wherein for each bearer the data packets are received at a 'green' data packet bucket of the bearer, the 'green' data packet bucket having a 'green rate' corresponding to the committed Information Rate of the bearer, at which 'green tokens' arrive in the bucket, whereby at any moment in time the bucket contains a quantity of 'green tokens', and a received data packet is designated as a 'green' packet when the size of the packet is less than or equal to the quantity of 'green tokens' in the bucket.

6. The method of claim 5 wherein, when the size of the received packet is greater than the quantity of 'green tokens' in the bucket, the received data packet is buffered for up to the maximum 'green' buffer time.

7. The method of claim 5, wherein when a data packet is not designated as 'green', it is moved to a 'yellow' data packet bucket of the bearer, the 'yellow' data packet bucket having a 'yellow rate' corresponding to the predetermined EIR, at which 'yellow tokens' arrive in the bucket, whereby at any moment in time the bucket contains a quantity of 'yellow tokens', and the data packet is designated as a 'yellow' packet when the size of the packet is less than or equal to the quantity of 'yellow tokens' in the bucket.

8. The method of claim 7 wherein, when the size of the data packet moved to the 'yellow' bucket is greater than the quantity of 'yellow tokens' in the bucket, the data packet is buffered for up to the maximum 'yellow' buffer time.

9. The method of claim 1 wherein buffered data packets are held in a buffer queue, whereby only a data packet at the head of the queue is designated as a 'green' or 'yellow' packet and passed to the TN if transporting the data packet over the transport network would not cause the respective maximum or excess Information Rate of the bearer to be exceeded.

10. The method of claim 9 wherein the buffer has a buffer queue size, whereby if a new data packet to be buffered in the buffer would cause the queue size to be exceeded, a data packet is removed from the buffer to release space in the queue for the new data packet.

11. The method of claim 1 wherein a data packet that is not designated as either a 'green' data packet or a 'yellow' data packet is discarded without being transported over the transport network.

12. A telecommunications network entity configured to receive data packets of a plurality of non-Guaranteed Bitrate, non-GBR, bearers prior to forwarding the data packets for transport over a transport network, TN, between a Serving gateway, S-GW, or Packet Data Network gateway, PDN-GW, and a radio base station, the network entity configured to handle the data packets on a per-bearer basis and comprising a bandwidth profiler configured to apply bandwidth profiling to the data packets of a bearer independently of the other bearers, wherein data packets are designated as 'green' data packets or as 'yellow' data packets, 'green' data packets being conformant with a predetermined committed Information Rate of the bearer and 'yellow' data packets not being conformant with the committed Information Rate, the bandwidth profiler further comprising a buffer for buffering one or more data packets for up to a predetermined maximum 'green' buffer time, wherein the profiler is configured to designate a data packet in the buffer as a 'green' data packet if transporting the data packet would not cause the maximum Information Rate of the bearer to be exceeded, and wherein the network entity is configured to forward the data packets designated as 'green' data packets and the data packets designated as 'yellow' data packets to an entry point of the transport network.

13. The network entity of claim 12, wherein a data packet is only designated as 'yellow' if it is also conformant with a predetermined Excess Information Rate, EIR, of the bearer, and wherein the profiler is further configured to buffer data packets for up to a predetermined maximum 'yellow' buffer time, and to designate a data packet in the buffer as a 'yellow' data packet if transporting the data packet would not cause the EIR of the bearer to be exceeded.

* * * * *